(12) United States Patent
Shin

(10) Patent No.: US 12,535,517 B2
(45) Date of Patent: Jan. 27, 2026

(54) INSULATION RESISTANCE MEASURING DEVICE AND BATTERY SYSTEM INCLUDING THE SAME

(71) Applicant: LG Energy Solution, Ltd., Seoul (KR)

(72) Inventor: Hyeonju Shin, Daejeon (KR)

(73) Assignee: LG Energy Solution, Ltd., Seoul (KR)

(*) Notice: Subject to any disclaimer, the term of this patent is extended or adjusted under 35 U.S.C. 154(b) by 261 days.

(21) Appl. No.: 18/564,693

(22) PCT Filed: Oct. 19, 2022

(86) PCT No.: PCT/KR2022/015974
§ 371 (c)(1),
(2) Date: Nov. 28, 2023

(87) PCT Pub. No.: WO2023/090659
PCT Pub. Date: May 25, 2023

(65) Prior Publication Data
US 2024/0272219 A1 Aug. 15, 2024

(30) Foreign Application Priority Data
Nov. 22, 2021 (KR) .................. 10-2021-0161633

(51) Int. Cl.
G01R 31/14 (2006.01)
G01R 31/12 (2020.01)
(52) U.S. Cl.
CPC ......... *G01R 31/14* (2013.01); *G01R 31/1263* (2013.01)
(58) Field of Classification Search
None
See application file for complete search history.

(56) References Cited

U.S. PATENT DOCUMENTS 11,448,706 B2 * 9/2022 Park .................. G01R 27/025
2013/0138373 A1 5/2013 Lee et al.
(Continued)

FOREIGN PATENT DOCUMENTS

EP 3258280 A1 12/2017
EP 3385729 A1 10/2018
(Continued)

OTHER PUBLICATIONS

Extended European Search Report including Search Opinion from 22895867.4, dated Sep. 2, 2024, pp. 1-9.
(Continued)

Primary Examiner — Jermele M Hollington
(74) Attorney, Agent, or Firm — Lerner David LLP

(57) ABSTRACT

An insulation resistance measuring device between a battery including a plurality of battery cells and a ground includes: a first voltage distribution unit configured to distribute a first voltage between the positive electrode of the battery and the ground; a second voltage distribution unit configured to distribute a second voltage between the negative electrode of the battery and the ground; a first switch connecting the positive electrode of the battery and the first voltage distribution unit; and a second switch connecting the negative electrode of the battery and the second voltage distribution unit; and a controller configured to when the first voltage is saturated during the on-period of the first switch, or the second voltage is saturated during a second on-period of the second switch, reduce a current switching cycle of the first and second switch from a previous switching cycle.

10 Claims, 5 Drawing Sheets

(56) References Cited

U.S. PATENT DOCUMENTS

| | | | |
|---|---|---|---|
| 2014/0095093 A1 | 4/2014 | Hong et al. | |
| 2018/0074113 A1 | 3/2018 | Sung et al. | |
| 2019/0011504 A1 | 1/2019 | Kim et al. | |
| 2020/0144812 A1 | 5/2020 | Shin | |
| 2022/0146561 A1 | 5/2022 | Ock et al. | |
| 2022/0179006 A1* | 6/2022 | Jang | G01R 31/385 |
| 2022/0299558 A1* | 9/2022 | Choi | G01R 31/385 |

FOREIGN PATENT DOCUMENTS

| | | |
|---|---|---|
| EP | 3674720 A1 | 7/2020 |
| JP | 2006-347267 A | 12/2006 |
| JP | 2008-139249 A | 6/2008 |
| JP | 2015-518141 A | 6/2015 |
| JP | 2018-508785 A | 3/2018 |
| JP | 2019-512679 A | 5/2019 |
| JP | 2020-523576 A | 8/2020 |
| JP | 2021-050963 A | 4/2021 |
| KR | 101361285 B1 | 2/2014 |
| KR | 101512395 B1 | 4/2015 |
| KR | 101741183 B1 | 5/2017 |
| KR | 20170057004 A | 5/2017 |
| KR | 20190072272 A | 6/2019 |
| KR | 102099414 B1 | 4/2020 |
| KR | 20200086887 A | 7/2020 |
| KR | 20210051539 A | 5/2021 |
| KR | 20210060210 A | 5/2021 |
| KR | 102259382 B1 | 6/2021 |
| KR | 20210073049 A | 6/2021 |

OTHER PUBLICATIONS

International Search Report for PCT/KR2022/015974 mailed Feb. 6, 2023. 3 pages.

* cited by examiner

[Figure 3]
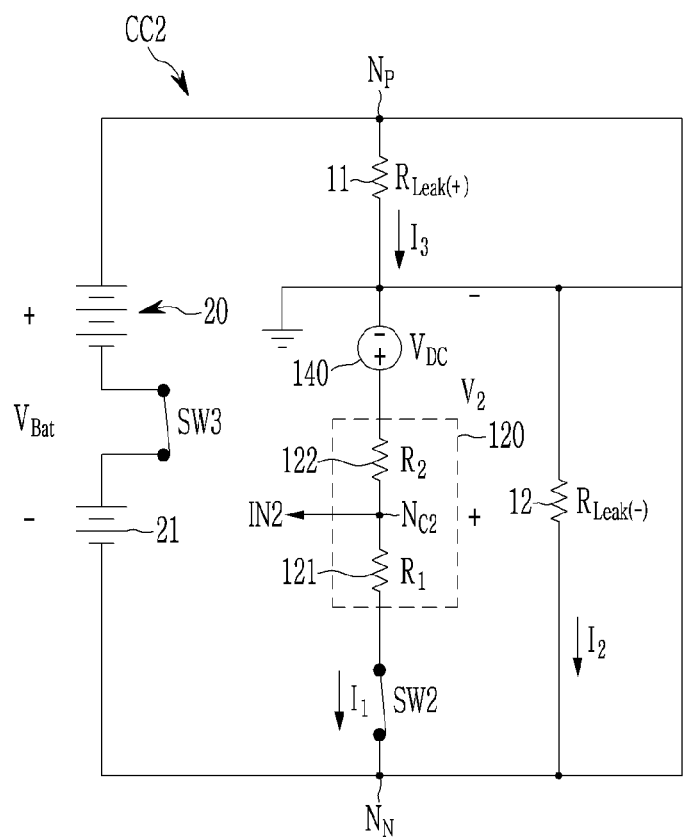

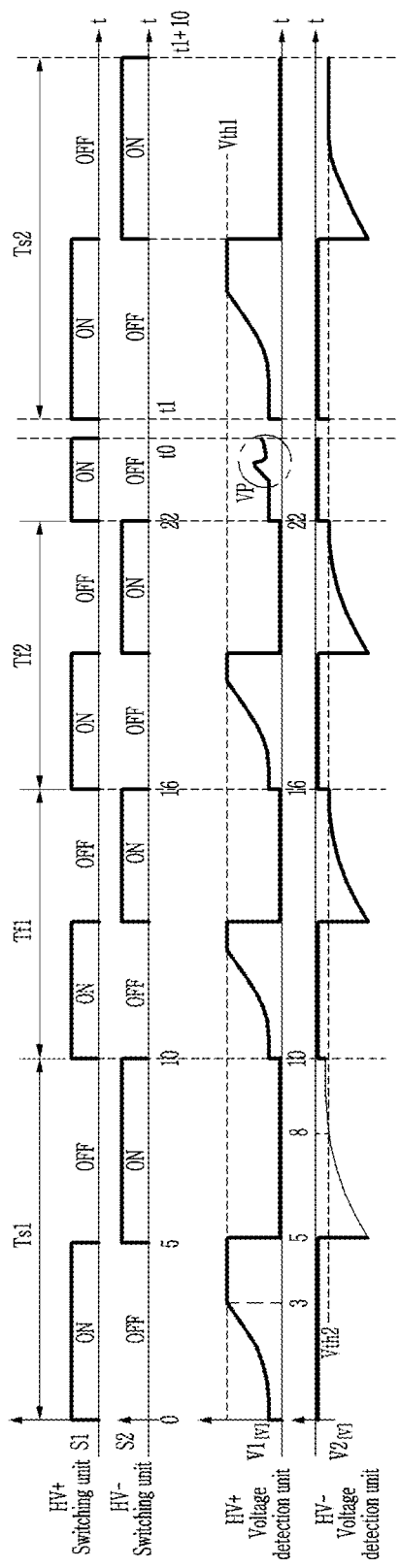
[Figure 5]

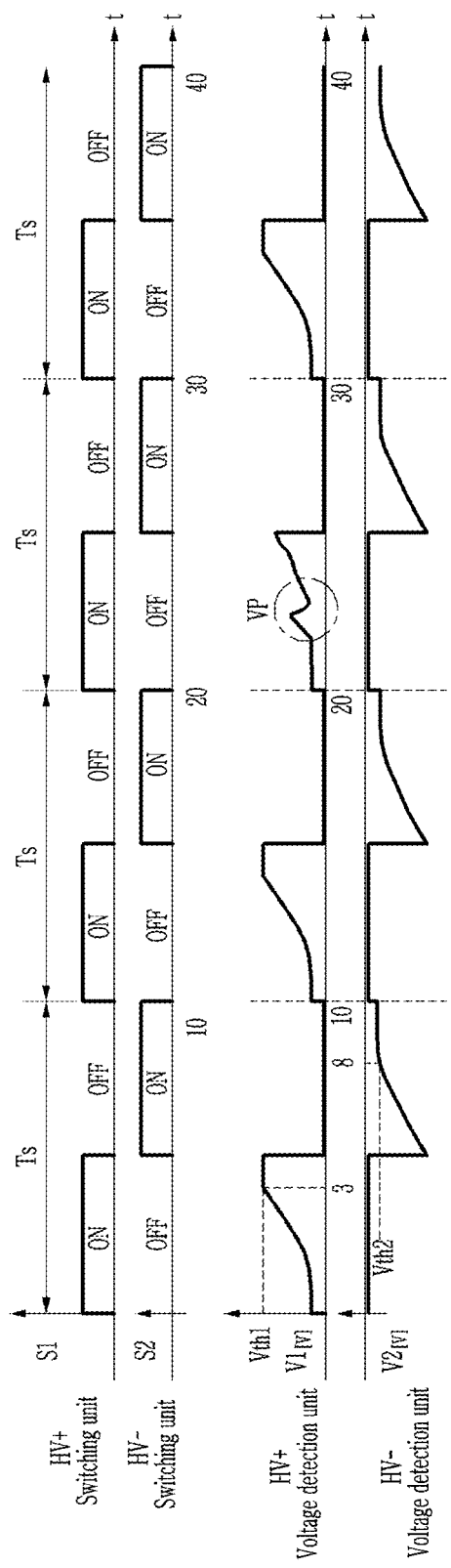
[Figure 4]

INSULATION RESISTANCE MEASURING DEVICE AND BATTERY SYSTEM INCLUDING THE SAME

CROSS-REFERENCE TO RELATED APPLICATION

The present application is a national phase entry under 35 U.S.C. § 371 of International Application No. PCT/KR2022/015974 filed Oct. 19, 2022, which claims priority from Korean Patent Application No. 10-2021-0161633 filed Nov. 22, 2021, all of which are incorporated herein by reference.

TECHNICAL FIELD

The present invention relates to an insulation resistance measuring device and a battery system including the same.

BACKGROUND ART

In devices such as electric vehicles or hybrid vehicles that use high power, high voltage (e.g., several hundreds of V) batteries, it is necessary to maintain the insulation of the battery well from a ground (e.g., a vehicle body). If the insulation of the battery is not maintained, a large leakage current flows from the battery, which may cause malfunction of nearby electronic devices.

Therefore, it is important to prevent the malfunction by calculating whether the insulation resistance between the battery and the ground falls below a certain value. Conventionally, the switch connected to the positive and negative electrodes of the battery was alternately turned on and off, and the voltage according to each state was detected to calculate the insulation resistance value. However, this method has a problem in that it takes a long time to calculate the insulation resistance and cannot accurately diagnose the breakdown point of the insulation resistance.

Conventionally, it is performed for as much as the time calculated to measure the insulation resistance. The cycle of turning the switch on and off is different according to a Y capacitance value of the vehicle. However, since the Y capacitance values of the automobiles are different for each automobile and are difficult to accurately measure, the maximum Y capacitance value has been used. However, there is a problem that the calculation of the insulation resistance takes a long time and the diagnosis of the breakdown point of the insulation resistance may be delayed.

The above information disclosed in this Background section is only for enhancement of understanding of the background of the invention, and therefore it may contain information that does not form the prior art that is already known in this country to a person of ordinary skill in the art.

SUMMARY

Technical Problem

The present invention seeks to measure insulation resistance.

The present invention seeks to diagnose the breakdown point of the insulation resistance.

Technical Solution

An insulation resistance measuring device between a battery including a plurality of battery cells and a ground according to an embodiment includes: a first voltage distribution unit configured to distribute a first voltage between a positive electrode of the battery and the ground; a second voltage distribution unit configured to distribute a second voltage between a negative electrode of the battery and the ground; a first switch connecting the positive electrode of the battery and the first voltage distribution unit; and a second switch connecting the negative electrode of the battery and the second voltage distribution unit, a controller configured to when the first voltage is saturated during a first on-period of the first switch, or the second voltage is saturated during a second on-period of the second switch, reduce a current switching cycle of the first and second switches from a previous switching cycle is reduced.

The controller is configured to control first on-period of the first switch and the second on-period of the second switch based on a time that the first voltage or the second voltage is saturated.

The controller is configured to when a period in which the first voltage or the second voltage decreases occurs during the first on-period of the first switch or the second on-period of the second switch, reset the current switching cycle to a predetermined initial switching cycle.

A first insulation resistance between the positive electrode of the battery and the ground and a second insulation resistance between the negative electrode of the battery and the ground may be further measured, and wherein the controller is configured to calculate a first insulation resistance value and a second insulation resistance value based on the first voltage and the second voltage.

The controller is configured to set a predetermined initial switching cycle based on a capacity of a Y capacitor connected in parallel between the battery and an external device.

A battery system according to the present disclosure includes a battery including a plurality of battery cells, and an insulation resistance measuring device for measuring an insulation resistance between the battery and a ground, wherein the insulation resistance measuring device includes: a first voltage distribution unit configured to distribute a first voltage between a positive electrode of the battery and the ground; a second voltage distribution unit configured to distribute a second voltage between a negative electrode of the battery and the ground; a first switch connecting the positive electrode of the battery and the first voltage distribution unit; and a second switch connecting the negative electrode of the battery and the second voltage distribution unit, and a controller configured to, when the first voltage is saturated during a first on-period of the first switch, or the second voltage is saturated during a second on-period of the second switch, reduce a current switching cycle of the first and second switch from a previous switching cycle.

The controller is configured to control first on-period of the first switch and the second on-period of the second switch based on a time that the first voltage or the second voltage is saturated.

The controller is configured to, when a period in which the first voltage or the second voltage decreases occurs during the first on-period of the first switch or the second on-period of the second switch, reset the current switching cycle to a predetermined initial switching cycle.

A first insulation resistance between the positive electrode of the battery and the ground and a second insulation resistance between the negative electrode of the battery and the ground may be further included, and wherein the controller is configured to calculate a first insulation resistance value based on the first voltage and a second insulation resistance value based on the second voltage.

The controller is configured to set a predetermined initial switching cycle based on a capacity of a Y capacitor connected in parallel between the battery and an external device.

Advantageous Effects

The present disclosure may reduce an insulation resistance measuring time.

The present disclosure may accuracy diagnosis an insulation resistance failure point.

BRIEF DESCRIPTION OF THE DRAWINGS

FIG. 3 is a circuit diagram schematically showing a second circuit formed in a battery system by a second switching mode.

FIG. 4 is a waveform diagram showing a switch control signal and a voltage according thereto when measuring a conventional insulation resistance.

FIG. 5 is a waveform diagram showing a switch control signal and a voltage measurement value corresponding thereto in a case of using a circuit for measuring an insulation resistance according to an embodiment of the present invention.

DETAILED DESCRIPTION

Figure 1:
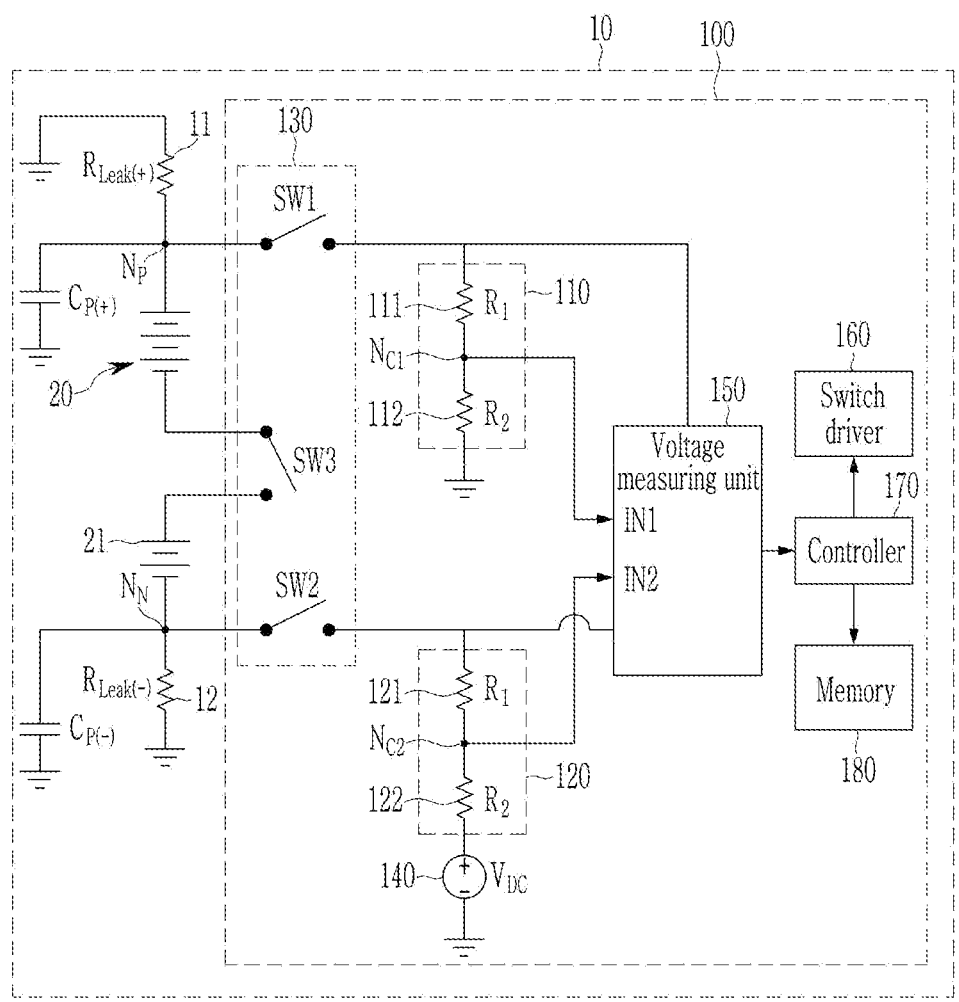
FIG. 1 is a circuit diagram showing an insulation resistance measuring circuit applied to a battery system according to an embodiment.

Embodiments disclosed in the present specification will be described in detail with reference to the accompanying drawings. In the present specification, the same or similar components will be denoted by the same or similar reference numerals, and an overlapped description thereof will be omitted. The terms "module" and "unit" for components used in the following description are used only in order to make the specification easier. Therefore, these terms do not have meanings or roles that distinguish them from each other by themselves. In describing embodiments of the present specification, when it is determined that a detailed description of the well-known art associated with the present invention may obscure the gist of the present invention, it will be omitted. The accompanying drawings are provided only in order to allow embodiments disclosed in the present specification to be easily understood and are not to be interpreted as limiting the spirit disclosed in the present specification, and it is to be understood that the present invention includes all modifications, equivalents, and substitutions without departing from the scope and spirit of the present invention.

Terms including ordinal numbers such as first, second, and the like will be used only to describe various components, and are not to be interpreted as limiting these components. The terms are only used to differentiate one component from others.

It is to be understood that when one component is referred to as being "connected" or "coupled" to another component, it may be connected or coupled directly to another component or may be connected or coupled to another component with the other component intervening therebetween. On the other hand, it is to be understood that when one component is referred to as being "connected or coupled directly" to another component, it may be connected or coupled to another component without the other component intervening therebetween.

It will be further understood that terms "comprises" or "have" used in the present specification specify the presence of stated features, numerals, steps, operations, components, parts, or a combination thereof, but do not preclude the presence or addition of one or more other features, numerals, steps, operations, components, parts, or a combination thereof.

FIG. 1 is a circuit diagram showing an insulation resistance measuring circuit applied to a battery system according to an embodiment.

A battery system 10 may include a battery 20, a first insulation resistor 11 electrically connected between the positive terminal NP of the battery 20 and a ground, a second insulation resistor 12 electrically connected between the negative terminal NN and the ground, and an insulation resistance measuring circuit 100.

Each of two insulation resistors 11 and 12 is a resistor representing the insulation state between the ground and the battery 20. If the insulation between the battery 20 and the ground is well maintained, first and second insulation resistors 11 and 12 have sufficiently large values. However, if the insulation between the battery 20 and the ground deteriorates, at least one of the first and second insulation resistors 11 and 12 may have less than a predetermined threshold resistance.

Also, the battery system 10 may include a positive electrode parasitic capacitor CP(+) electrically connected to the positive terminal NP of the battery 20 and a negative electrode parasitic capacitor CP(−) electrically connected to the negative terminal NN. The parasitic capacitors CP(+) and CP(−) are each a capacitor to represent the capacitance component formed between the ground and the battery 20. As shown in FIG. 1, the parasitic capacitor CP(+) may be connected in parallel to the insulation resistor 11, and the parasitic capacitor CP(−) may be connected in parallel to insulation resistor 12.

The insulation resistance measuring circuit 100 is a circuit for measuring the resistance of the first insulation resistor 11 and the second insulation resistor 12 connected to the battery 20.

The insulation resistance measuring circuit 100 may include a first voltage distribution unit 110 and a second voltage distribution unit 120. The first voltage distribution unit 110 includes a first protection resistor 111 and a first reference resistor 112. The first protection resistor 111 and the first reference resistor 112 may be connected through a first common node NC1. Also, the second voltage distribution unit 120 includes a second protection resistor 121 and a second reference resistor 122. The second protection resistor 121 and the second reference resistor 122 may be connected through a second common node NC2.

Each resistance of the first protection resistor 111, the first reference resistor 112, the second protection resistor 121, and the second reference resistor 122 may be stored in advance in the memory 180.

Furthermore, according to an embodiment, the insulation resistance measuring circuit 100 may further include a reference voltage source 140 connected between the second reference resistor 122 and the ground.

The reference voltage source 140 may supply a predetermined voltage relative to the ground to the second voltage distribution unit 120. The reference voltage source 140 may supply a voltage VDC based on ground to the second voltage distribution unit 120. The second protection resistor 121 and the second reference resistor 122 are connected in series between the reference voltage source 140 and the negative terminal NN of the battery 20, and the voltage applied between the second common node NC2 to which the second protection resistor 121 and the second reference resistor 122 are connected and the ground may be input to the voltage measuring unit 150. The voltage value of the voltage VDC supplied from the reference voltage source 140 may be stored in the memory 180 in advance.

The insulation resistance measuring circuit 100 may further include a switching unit 130.

The switching unit 130 may include a first switch SW1 and a second switch SW2. The first switch SW1 may be connected between the positive terminal NP and the first voltage distribution unit 110. The second switch SW2 may be connected between the positive terminal NN and the second voltage distribution unit 120.

The switching unit 130 may further include a safety switch SW3. The safety switch SW3 may be installed between two battery cells 21 and 22 coupled in series adjacent to each other within the battery 20. When the safety switch SW3 is turned off, the use of the battery 20 is stopped. The switch driver 160 may control the safety switch SW3 independently from the first switch SW1 and the second switch SW2.

The first switch SW1 and the second switch SW2 may be controlled independently in response to the signal output from the switch driver 160. That is, the first switch SW1 and the second switch SW2 may be turned on or turned off, respectively. Therefore, the switch mode may include a first switching mode in which the first switch SW1 and the second switch SW2 are 'turned-on/turned-off', a second switching mode in which they are 'turned-off/turned-on', a third switching mode in which they are 'turned-on/turned-on', and a fourth switching mode in which they are 'turned-off/turned-off'. Each switching mode may be executed only while the battery 20 is in a no-load condition. The no-load state may be said to be a state in which the charging and discharging of the battery 20 is stopped.

For example, the switch driver 160 may form a first circuit (referring to FIG. 2, CC1) by turning on the first switch SW1 and turning off the second switch SW2 in the first switching mode. The first circuit CC1 is a circuit in which the first voltage distribution unit 110 is connected to the positive terminal NP and the second voltage distribution unit 120 is separated from the negative terminal NN. This is described later with reference to FIG. 2.

The switch driver 160 may form a second circuit (referring to FIG. 3, CC2) by turning off the first switch SW1 and turning on the second switch SW2 in the second switching mode. The second circuit CC2 means a circuit in which the first voltage distribution unit 110 is separated from the positive terminal NP and the second voltage distribution unit 120 is connected to the negative terminal NN. This is described later with reference to FIG. 3.

The switch driver 160 may turn on both first switch SW1 and second switch SW2 in the third switching mode.

In addition, the switch driver 160 may turn off both first switch SW1 and second switch SW2 in the fourth switching mode.

The voltage measuring unit 150 may measure the voltages of first common node NC1 and second common node NC2. Specifically, the voltage applied to the first voltage distribution unit 110 may be distributed according to a ratio between the resistance of the first protection resistor 111 and the resistance of the first reference resistor 112 and may be measured by the voltage measuring unit 150. Similarly, the voltage applied to the second voltage distribution unit 120 may be distributed according to a ratio between the resistance of the second protection resistor 112 and the resistance of the second reference resistor 122, and may be measured by the voltage measuring unit 150. That is, the voltage measuring unit 150 may measure the voltage (hereinafter referred to as a first voltage V1) applied between the first common node NC1 and the ground and the voltage (hereinafter referred to as a second voltage V2) applied between the second common node NC2 and the ground, respectively. The first voltage V1 may be equal to the voltage between two terminals of the first reference resistor 112, and the second voltage V2 may be equal to the sum of the voltage between two terminals of the second reference resistor 122 and VDC.

The voltage measuring unit 150 may include a first input port IN1 connected to the first common node NC1 and a second input port IN2 connected to the second common node NC2. The voltage measuring unit 150 may include a voltage sensor and an ADC (Analog-Digital Converter). The voltage sensor outputs an analog signal corresponding to the voltage input through the first input port IN1 and an analog signal corresponding to the voltage input through the second input port IN2 to the ADC. The ADC may convert the analog signal of the first input port IN1 into a digital signal and convert the analog signal of the second input port IN2 into a digital signal.

The voltage measuring unit 150 measures the battery voltage VBat between the positive and negative electrodes of the battery 20. The battery voltage VBat may be measured by the voltage measuring unit 150 while the third switching mode is running. Alternatively, a voltage sensor (not shown) provided separately from the voltage measuring unit 150 may measure the battery voltage VBat and output a measurement signal indicating the measured terminal voltage VBat to the controller 170.

The controller 170 is operably coupled to the voltage measuring unit 150 and the switch driver 160. The controller 170 controls the switch driver 160 based on the measurement signals output from the voltage measuring unit 150. In terms of hardware, the controller 170 may be implemented by including at least one of application specific integrated circuits (ASICs), digital signal processors (DSPs), digital signal processing devices (DSPDs), programmable logic devices (PLDs), field programmable gate arrays (FPGAs), microprocessors, and electrical units for performing other functions.

The memory 180 may additionally store data, instruction words, and software required for the overall operation of the battery system 10. The memory 120 may include a storage medium of at least one type among a memory type, a hard disk type, a solid state disk type, a silicon disk drive type, a multimedia card micro type, a random access memory (RAM), a static random access memory (SRAM), a read-only memory (ROM), an electrically erasable programmable read-only memory (EEPROM), and a programmable read-only memory (PROM).

Hereinafter, the method in which the insulation resistance measuring circuit 100 according to the present invention calculates the resistance of the first insulation resistor 11 and the resistance of the second insulation resistor 12, respectively, is described in detail with reference to FIG. 2 and FIG. 3. Hereinafter, the resistance of the first insulation resistor 11 is referred to as 'a first insulation resistance' or 'RLeak(+)', and the resistance of the second insulation resistor 12 is referred to as 'a second insulation resistance' or 'RLeak(−)'.

Figure 2:
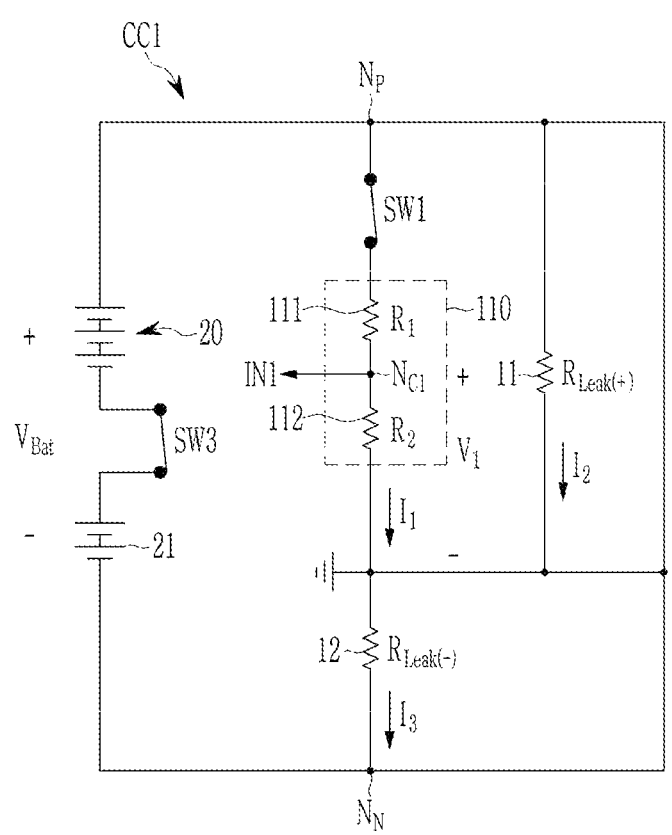
FIG. 2 is a circuit diagram schematically showing a first circuit formed in a battery system by a first switching mode.

FIG. 2 is a circuit diagram schematically showing a first circuit formed in a battery system by a first switching mode.

When a certain amount of a time passes from a time when the first switching mode is initiated, the parasitic capacitor CP(+) and CP(−) become a stable state in which the first voltage V1 does not change over the time. Therefore, for convenience of description, the parasitic capacitors CP(+) and CP(−) are omitted.

In the circuit CC1, the first protection resistor 111 and the first reference resistor 112 may be connected in series between the positive terminal NP of the battery 20 and the ground. Specifically, one terminal of each of the first protection resistor 111 and the first reference resistor 112 is connected to the other through the first common node NC1. In addition, the other terminal of the first protection resistor 111 is connected to or disconnected from the positive terminal NP through the first switch SW1. Also, the other terminal of the first reference resistor 112 is connected to the ground.

Here, the current flowing from the positive terminal NP to the first protection resistor 111 and the first reference resistor 112 is referred to as I1, the current flowing from the positive terminal NP to the first insulation resistor 11 is referred to as I2, and the current flowing through the second insulation resistor 12 is referred to as I3.

Then, the first voltage V1 is expressed as Equation 1 below.

$$V1 = I1 * R2 \quad \text{(Equation 1)}$$

If Equation 1 is summarized for I1, it may be expressed as Equation 2 below.

$$I_1 = \frac{V_1}{R_2} \quad \text{(Equation 2)}$$

In addition, since the first voltage distribution unit 110 and the first insulation resistor 11 are electrically coupled in parallel, the relationship shown in Equation 3 below is established.

$$I_1 R_1 + V_1 = I_2 R_{Leak(+)} \quad \text{(Equation 3)}$$

When summarizing Equation 3 by using Equation 2, Equation 4 may be derived.

$$I_2 = \frac{I_1 R_1 + V_1}{R_{Leak(+)}} = \frac{\left(\frac{V_1}{R_2}\right) R_1 + V_1}{R_{Leak(+)}} \quad \text{(Equation 4)}$$

On the other hand, if Kirchhoff's current law is applied to the first circuit CC1, Equation 5 is derived.

$$I_1 + I_2 = I_3 \quad \text{(Equation 5)}$$

When substituting Equations 2 and 4 into Equation 5 and summarizing for I3, it may be expressed as Equation 6 below.

$$I_3 = \frac{V_1}{R_2} + \frac{\left(\frac{V_1}{R_2}\right) R_1 + V_1}{R_{Leak(+)}} \quad \text{(Equation 6)}$$

On the other hand, in a case that the battery voltage is VBat, if Kirchhoff's voltage law is applied to the first circuit CC1, an equation of the first row included in Equation 7 below is derived. Then, if the equation of the first row is summarized by using I2 and I3 obtained through Equations 4 and 6, the equation of the last row included in Equation 7 below may be derived.

$$V_{Bat} = I_2 R_{Leak(+)} + I_3 R_{Leak(-)} \quad \text{(Equation 7)}$$

$$V_{Bat} = \left(\frac{\left(\frac{V_1}{R_2}\right) R_1 + V_1}{R_{Leak(+)}}\right) R_{Leak(+)} + \left(\frac{V_1}{R_2} + \frac{\left(\frac{V_1}{R_2}\right) R_1 + V_1}{R_{Leak(+)}}\right) R_{Leak(-)}$$

$$V_{Bat} = \left(\frac{V_1}{R_2}\right) R_1 + V_1 + \left(\frac{V_1}{R_2} + \frac{\left(\frac{V_1}{R_i}\right) R_1 + V_1}{R_{Leak(+)}}\right) R_{Leak(-)}$$

The equation in the last row included in Equation 7 is one of two circuit equations needed to calculate the first insulation resistance RLeak(+) and the second insulation resistance RLeak(−).

FIG. 3 is a circuit diagram schematically showing a second circuit formed in a battery system by a second switching mode.

Similar to the first switching mode described above, in a case that a certain amount of a time has passed from the start of the second switching mode, the second voltage V2 becomes a stable state that no longer changes over the time due to the parasitic capacitors CP(+) and CP(−). Therefore, for convenience of description, the parasitic capacitors CP(+) and CP(−) are omitted.

In the circuit CC2, the second protection resistor 121 and the second reference resistor 122 may be connected in series between the negative terminal NN of the battery 20 and the reference voltage source 140. Specifically, one terminal of each of the second protection resistor 121 and the second reference resistor 122 is connected to the other through the second common node NC2. In addition, the other terminal of the second protection resistor 121 is connected to or disconnected from the negative terminal NN through the second switch SW2. Also, the other terminal of the second reference resistor 122 is connected to the reference voltage source 140.

Here, the current flowing from the reference voltage source 140 through the second reference resistor 122 and the second protection resistor 121 is referred to as I1, the current flowing through the second insulation resistor 12 is referred to as I2, and the current flowing from the positive terminal NP through the first insulation resistor 11 is referred to as I3.

Then, the second voltage V2 is expressed as Equation 8 below.

$$V_2 = V_{DC} - I_1 R_2 \quad \text{(Equation 8)}$$

If Equation 8 is rearranged for I1, it may be expressed as Equation 9 below.

$$I_1 = \frac{V_{DC} - V_2}{R_2} \quad \text{(Equation 9)}$$

In addition, since the second insulation resistor 12 is electrically coupled in parallel to the serial connection circuit of the second voltage distribution unit 120 and the reference voltage source 140, the relationship shown in Equation 10 below is established.

$$I_1 R_1 - V_2 = I_2 R_{Leak(-)} \quad \text{(Equation 10)}$$

By rearranging Equation 10 by using Equation 9, Equation 11 may be derived as below.

$$I_2 = \frac{I_1 R_1 - V_2}{R_{Leak(-)}} = \frac{\left(\frac{V_{DC} - V_2}{R_2}\right) R_1 - V_2}{R_{Leak(-)}} \quad \text{(Equation 11)}$$

On the other hand, if Kirchhoff's current law is applied to the second circuit CC2, Equation 12 is derived as below.

$$I_3 = I_1 + I_2 \quad \text{(Equation 12)}$$

When substituting Equations 9 and 11 into Equation 12 and rearranging for I3, it may be expressed as Equation 13 as below.

$$I_3 = \frac{V_{DC} - V_2}{R_2} + \frac{\left(\frac{V_{DC} - V_2}{R_2}\right) R_1 - V_2}{R_{Leak(-)}} \quad \text{(Equation 13)}$$

Meanwhile, in a case that the battery voltage is VBat, when Kirchhoff's voltage law is applied to the second circuit CC2, the equation of the first row included in Equation 14 below is derived. Also, if the equation of the first row is arranged by using I2 and I3 obtained through Equations 11 and 13, the equation of the last row included in Equation 14 below may be derived.

$$V_{Bat} = I_2 R_{Leak(-)} + I_3 R_{Leak(+)} \quad \text{(Equation 14)}$$

$$V_{Bat} = \left(\frac{\left(\frac{V_{DC} - V_2}{R_2}\right) R_1 - V_2}{R_{Leak(-)}}\right) R_{Leak(-)} + \left(\frac{V_{DC} - V_2}{R_2} + \frac{\left(\frac{V_{DC} - V_2}{R_2}\right) R_1 - V_2}{R_{Leak(-)}}\right) R_{Leak(+)}$$

$$V_{Bat} = \left(\frac{V_{DC} - V_2}{R_2}\right) R_1 - V_2 + \left(\frac{V_{DC} - V_2}{R_2} + \frac{\left(\frac{V_{DC} - V_2}{R_2}\right) R_1 - V_2}{R_{Leak(-)}}\right) R_{Leak(+)}$$

The equation in the last row included in Equation 14 is the other two circuit equations for calculating the first insulation resistance RLeak(+) and the second insulation resistance RLeak(−).

The solution of a system of equations including the equation in the last row of Equation 7 and the equation in the last row of Equation 14 may be expressed as Equation 15 below.

$$R_{Leak(+)} = \frac{(V_{Bat} - A)(V_{Bat} - C) - AC}{D(V_{Bat} - A) + BC} \quad \text{(Equation 15)}$$

$$R_{Leak(-)} = \frac{(V_{Bat} - A)(V_{Bat} - C) - AC}{B(V_{Bat} - A) + AD}$$

$$\therefore A = \left(\frac{V_1}{R_2}\right) R_1 + V_1$$

$$\therefore B = \frac{V_1}{R_2}$$

$$\therefore C = \left(\frac{V_{DC} - V_2}{R_2}\right) R_1 - V_2$$

$$\therefore D = \frac{V_{DC} - V_2}{R_2}$$

In Equation 15, each of R1, R2, and VDC is a predetermined value, and each of VBat, the first voltage V1 and the second voltage V2 is a value measured by the voltage measuring unit 150. The voltage measuring unit 150 outputs measurement signals representing VBat, the first voltage V1, and the second voltage V2 to the controller 170, respectively. Each of the first voltage V1 and the second voltage V2 may be measured within a predetermined short period (e.g., 5 seconds) before and after the measurement of VBat.

The controller 170 may calculate the first insulation resistance RLeak(+) and the second insulation resistance RLeak(−) by using Equation 15 based on VBat, the first voltage V1, and the second voltage V2 indicated by the measured signal output from the voltage detection unit 130, respectively.

The controller 170 may compare at least one of the first insulation resistance RLeak(+) and the second insulation resistance RLeak(−) with a given threshold resistance. The controller 170 diagnoses whether the first and second insulation resistors 11 and 12 between the battery 20 and the ground maintain an insulation state. That is, the controller 170 monitors whether the first insulation resistance RLeak(+) or the second insulation resistance RLeak(−) is less than or equal to a threshold resistance.

The insulation resistance measuring circuit 100 may transmit the diagnosis results of the first and second insulation resistors 11 and 12 to an external device. The external device may be, for example, an electronic control unit (ECU) of the vehicle.

The insulation resistance measuring circuit 100 may output a warning message when the insulation between battery 20 and the ground is not properly maintained. The warning message may be information corresponding to the diagnosis result of the first and second insulation resistors 11 and 12. The warning message may be composed of an LED, LCD, alarm, or a combination thereof. In order to execute the insulation resistance calculation using Equation 15 described above and various control logics, the controller 170 may include a processor known in the art to which the present invention belongs, an application-specific integrated circuit (ASIC), another chipset, a logic circuit, a register, a communication modem, a data processing device, and the like.

FIG. 4 is a waveform diagram showing a switch control signal and a corresponding voltage when measuring a conventional insulation resistance.

The controller 170 may control the switch driver 160 so that the first switch SW1 and the second switch SW2 operate at a constant switching cycle. A signal for the switch driver 160 to control the first switch SW1 is referred to as a first switch signal S1, and a signal to control the second switch SW2 is referred to as a second switch signal S2.

As described above, the voltage of the first common node NC1 measured by the voltage measuring unit 150 is referred to as a first voltage V1, and the voltage of the second common node NC2 is referred to as a second voltage V2.

When the battery system 10 is connected to an external device, the controller 170 may calculate a tau value based on the Y capacitor, which is a capacitor connected in parallel between the battery system 10 and the external device. Here, the external device may be a vehicle. Then, the controller 170 may calculate a saturation time of the first voltage V1 and the second voltage V2 based on the calculated tau value, and set a switching period (Ts) including the saturation time. The switching period Ts refers to a period from when the first switch SW1 is turned on to when the first switch SW1 is next turned on, or from when the second switch SW2 is turned on to when the second switch SW2 is next turned on.

It takes a certain amount of the time for the first voltage V1 and the second voltage V2 to be stabilized by the Y capacitor. The first voltage V1 and the second voltage V2 used for the insulation resistance measurement should be the saturation voltage in a stable state. Hereinafter, the saturation voltage is referred to as Vth. Therefore, each of the saturation voltages of the first and second voltages V1 and V2 may be used for the insulation resistance measurement described above. In FIG. 4, the saturation voltages Vth1 and Vth2 are shown as being at a constant level in consideration of the fact that the insulation resistance does not change for a short time, but it is not limited thereto.

Meanwhile, the Y capacitance value of the controller 170 may be very small when the battery system 10 is electrically separated from the external device. In this case, the controller 170 may set the minimum switching period Ts.

However, as described above, since the Y capacitor value may be different for each vehicle, the controller 170 may conventionally set the switching period Ts based on the maximum Y capacitor value that may be obtained when the battery system 10 and the vehicle are connected.

For example, FIG. 4 shows a case where the switching period Ts of the insulation resistance measuring circuit 100 is 10 seconds. The first switch signal S1 may control the first switch SW1 to repeat an on period and an off period at a period of 10 seconds. Therefore, the first switch SW1 repeats the turning on and the turning off every 5 seconds. In addition, the second switch signal S2 may control the second switch SW2 to repeat the off period and the on period by a period of 10 seconds. Therefore, the second switch SW2 also repeats the turning on and the turning off every 5 seconds.

The first voltage V1 may be saturated after a predetermined period of time. Here, the saturation may mean that the voltage does not increase any more and the voltage value is maintained during the on-period of the switch. During the on-period of first switch SW1, first voltage V1 may be saturated.

However, as shown in FIG. 4, since the on-period of the first switch SW1 according to the switching period Ts has not yet elapsed even after the first voltage V1 is saturated, from the time when the first voltage V1 reaches the voltage value of the saturation voltage Vth1 to the time when the on-period elapses, the first voltage V1 may be maintained as the saturation voltage Vth1 during the remaining on-period of the first switching signal S1.

Similarly, the second voltage V2 may also be saturated after a predetermined period of time. However, since the on-period of the second switch SW2 according to the switching period Ts has not yet elapsed even after the second voltage V2 is saturated, the second voltage V1 may also be maintained as the saturation voltage Vth2 for the remaining on-period of the second switching signal S2.

As described above, as the period in which the first voltage V1 and the second voltage V2 are maintained as the saturation voltage increases, unnecessary time required for the insulation resistance measurement may increase.

Meanwhile, as shown in FIG. 4, An abnormal voltage event VP may occur while measuring the first voltage V1 in the voltage measuring unit 150. The abnormal voltage event VP may include a case where the first voltage V1 or the second voltage V2 rapidly increases and then rapidly decreases. The abnormal voltage event VP can be caused by various causes such as the destruction of the insulation resistance and errors in the measurement, and the voltage (e.g., V1, V2) values required to measure the insulation resistance may not be accurately measured doe to the abnormal voltage event VP.

Since the value of first voltage V1 measured in the period including the abnormal voltage event VP is not valid for measuring the insulation resistance, the insulation resistance must be measured using the first voltage V1 measured in the next switching cycle. That is, in order to accurately measure the insulation resistance, there may be a waiting time until the next switching cycle is completed.

For example, as shown in FIG. 4, when the abnormal voltage event VP is generated in the first voltage V1 during the on-period of the first switch SW1, in this period, it may be difficult to measure a valid voltage value for the first voltage V1. Therefore, in order to obtain the valid voltage value of the first voltage V1, a time (at least 10 seconds) after the on-period of the next first switch SW1 ends must be passed.

Accordingly, in the related art, it was not possible to accurately know when an abnormal voltage event of the insulation resistance occurred. As a result, when a random problem occurs, it is not clear whether it is an external device problem or an internal problem in the battery system.

FIG. 5 is a waveform diagram showing a switch control signal and a voltage measurement value corresponding thereto in a case of using a circuit for measuring an insulation resistance according to an embodiment of the present invention.

In FIG. 5, it is shown as if the saturation voltage (Vth) is at a constant level in consideration of the fact that the insulation resistance does not change for a short time, but the present disclosure is not limited thereto.

The controller 170 may set an initial switching cycle Ts1 based on a maximum Y capacitor value that may be formed when the battery system 10 and the vehicle are connected.

For example, the controller 170 may calculate the tau value based on the Y capacitor, which is a capacitor connected in parallel between the battery system 10 and the external device, and calculate the saturation times of the first voltage V1 and the second voltage V2 based on the calculated tau value, and set the switching cycle Ts1 at least including the saturation time of the first voltage V1 and the second voltage V2. In FIG. 5, the case where the initial switching cycle Ts1 of the insulation resistance measuring circuit 100 is 10 seconds is shown as an example.

As shown in FIG. 5, In the initial switching cycle Ts1, the first voltage V1 may be saturated after a certain period of time. However, since the on-period of the first switch SW1 according to the switching cycle Ts1 has not yet elapsed even after the first voltage V1 is saturated, from the time when the first voltage V1 reaches the voltage value of the saturation voltage Vth1 to the time when the on-period of the first switching signal S1 all elapses, the first voltage V1 may be maintained as the saturation voltage Vth1 for the remaining on-period of the first switching signal S1. In this case, the controller 170 may decrease the on-period of the first switch SW1, and accordingly, the switching cycle Ts1 may decrease. For example, the controller 170 may set the on-period of the first switch SW1 to 3 seconds, a time required for the first voltage V1 to be saturated in the previous switching cycle Ts1.

Similarly, in the initial switching cycle Ts1, the second voltage V2 may be saturated after a certain period of time. However, since the on-period of second switch SW2 according to the switching cycle Ts1 has not yet elapsed even after the second voltage V2 is saturated, from the time when the second voltage V2 reaches the voltage value of the saturation voltage Vth2 to the time when the on-period of the second switching signal S2 elapses, the second voltage V1 may be maintained as the saturation voltage Vth2 for the remaining on-period of the second switching signal S2. In this case, the controller 170 may decrease the on-period of the second switch SW2, and accordingly, the switching cycle Ts1 may decrease. For example, the controller 170 may set the on-period of the second switch SW2 to 3 seconds, a time required for the second voltage V2 to be saturated in the previous switching cycle is Ts1.

In FIG. 5, it is shown that the first voltage V1 is saturated when 3 seconds have passed since the first switching signal S1 is turned on, and the second voltage V2 is saturated when 3 seconds have passed since the second switching signal S2 is turned on, thereby reaching the respective saturation voltages Vth1 and Vth2. Accordingly, the controller 170 may set 6 seconds as a new switching cycle Tf1.

From then on, the switching driver 160 can control the first switch SW1 and the second switch SW2 with the new switching cycle Tf1. Therefore, the period in which the first voltage V1 and the second voltage V2 are saturated may be shorter than the saturation period in the case of controlling with the initial switching Ts1 cycle.

If the first switch SW1 and the second switch SW2 are controlled with the new switching cycle Tf1, the time required to measure the insulation resistance may be reduced.

Meanwhile, as shown in FIG. 5, while measuring the first voltage V1 in the voltage measuring unit 150, the abnormal voltage event VP may occur at a predetermined time t0. When the controller 170 confirms that the abnormal voltage event VP has occurred, the controller 170 may control the first switch SW1 and the second switch SW2 to be turned off. Also, the controller 170 may reset the switching cycle Tf2 as the initial switching cycle Ts2.

There may be a delay when the controller 170 checks the abnormal voltage event VP, changes the states of the first switch SW1 and the second switch SW2 to the off state, and sets the new switching cycle Ts2. Accordingly, the first switch SW1 and the second switch SW2 may be controlled from the time t1 as the new switching cycle Ts2. However, the time between t0 and t1 is only a normal propagation delay and is not a time interval that greatly affects the measurement of insulation resistance.

Therefore, in order to obtain the valid voltage value of the first voltage V1, it is necessary to wait 5 seconds+a seconds (t0-t1) until the on-period of the next first switch SW1 ends. This is a significantly time reduced a waiting time than is required for a conventional insulation resistance measurement.

Thereafter, the controller 170 may control the first switch SW1 and the second switch SW2 with the new switching cycle Ts2 and calculate the new insulation resistance value.

Even while the controller 170 is operating with the new switching cycle Ts2,

When the on-period of the first switch SW1 according to switching cycle Ts2 does not elapse even after the first voltage V1 is saturated or when the on-period of the second switch SW2 according to the switching cycle Ts2 does not yet elapse even after the second voltage V2 is saturated, the controller 170 may reduce the switching cycle Ts2 by reducing the on-period of the first switch SW1 and the second switch SW2.

However, although the controller 170 controls the first switch SW1 and the second switch SW2 with the new switching cycle Ts2, there may be cases where the first voltage V1 and the second voltage V2 do not reach the saturation. In this case, the controller 170 may determine that a problem has occurred in the insulation resistance, and may terminate all operations of the first switch SW1 and the second switch SW2.

According to an embodiment of the present invention, a switching cycle for the insulation resistance calculation may be determined.

According to an embodiment of the present invention, the diagnosis of the insulation resistance failure may be accurately determined. In addition, the validity of the insulation resistance value may be guaranteed by excluding the voltage value for the switching period, which is problematic in the insulation resistance measurement.

While this invention has been described in connection with what is presently considered to be practical embodiments, it is to be understood that the invention is not limited to the disclosed embodiments. On the contrary, it is intended to cover various modifications and equivalent arrangements included within the spirit and scope of the appended claims.

The invention claimed is:

1. An insulation resistance measuring device for measuring an insulation resistance between a battery including a plurality of battery cells and ground, comprising:
    a first voltage distribution unit, configured to distribute a first voltage between a positive electrode of the battery and the ground;
    a second voltage distribution unit, configured to distribute a second voltage between a negative electrode of the battery and the ground;
    a first switch connecting the positive electrode of the battery and the first voltage distribution unit;
    a second switch connecting the negative electrode of the battery and the second voltage distribution unit; and
    a controller configured to, when the first voltage, is saturated during a first on-period of the first switch, or the second voltage, is saturated during a second on-period of the second switch, reduce a current switching cycle of the first and second switch from a previous switching cycle.

2. The insulation resistance measuring device of claim 1, wherein
    the controller is configured to control first on-period of the first switch and the second on-period of the second switch based on a time that the first voltage or the second voltage is saturated.

3. The insulation resistance measuring device of claim 1, wherein
the controller is configured to, when a period in which the first voltage or the second voltage decreases occurs during the first on-period of the first switch or the second on-period of the second switch,
reset the current switching cycle to a predetermined initial switching cycle.

4. The insulation resistance measuring device of claim 1, further comprising:
a first insulation resistance between the positive electrode of the battery and the ground; and
a second insulation resistance between the negative electrode of the battery and the ground, and
the controller configured to calculates a first insulation resistance value and a second insulation resistance value based on the first voltage and the second voltage.

5. The insulation resistance measuring device of claim 3, wherein
the predetermined initial switching cycle based on a capacity of a Y capacitor connected in parallel between the battery and an external device.

6. A battery system comprising:
a battery including a plurality of battery cells; and
an insulation resistance measuring device for measuring an insulation resistance between the battery and a ground, wherein the insulation resistance measuring device includes:
a first voltage distribution unit configured to distribute a first voltage between a positive electrode of the battery and the ground;
a second voltage distribution unit configured to distribute a second voltage between a negative electrode of the battery and the ground;
a first switch connecting the positive electrode of the battery and the first voltage distribution unit;
a second switch connecting the negative electrode of the battery and the second voltage distribution unit; and
a controller configured to when the first voltage is saturated during a first on-period of the first switch, or the second voltage is saturated during a second on-period of the second switch, reduce a current switching cycle of the first and second switch from a previous switching cycle.

7. The battery system of claim 6, wherein
the controller is configured to control-first on-period of the first switch and the second on-period of the second switch based on a time that the first voltage or the second voltage is saturated.

8. The battery system of claim 6, wherein
the controller is configured to, when a period in which the first voltage or the second voltage decreases occurs during the first on-period of the first switch or the second on-period of the second switch,
reset the current switching cycle to a predetermined initial switching cycle.

9. The battery system of claim 6, further comprising:
a first insulation resistance between the positive electrode of the battery and the ground; and
a second insulation resistance between the negative electrode of the battery and the ground, and
wherein the controller is configured to calculates a first insulation resistance value and a second insulation resistance value based on the first voltage and the second voltage.

10. The battery system of claim 8, wherein
the controller is configured to set a predetermined initial switching cycle based on a capacity of a Y capacitor connected in parallel between the battery and an external device.

* * * * *